(12) United States Patent
Guderian et al.

(10) Patent No.: US 9,995,364 B2
(45) Date of Patent: Jun. 12, 2018

(54) DEVICE FOR MECHANICALLY ADJUSTING VIBRATION BEHAVIOR OF A MACHINE ELEMENT

(71) Applicant: Siemens Aktiengesellschaft, München (DE)

(72) Inventors: Bernd Guderian, Schwabach (DE); Peter Lemberg, Burgthann (DE); Andreas Proksch, Nürnberg (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 235 days.

(21) Appl. No.: 14/766,907

(22) PCT Filed: Jan. 24, 2014

(86) PCT No.: PCT/EP2014/051432
§ 371 (c)(1),
(2) Date: Aug. 10, 2015

(87) PCT Pub. No.: WO2014/122037
PCT Pub. Date: Aug. 14, 2014

(65) Prior Publication Data
US 2015/0369329 A1 Dec. 24, 2015

(30) Foreign Application Priority Data
Feb. 11, 2013 (EP) ...................................... 13154769

(51) Int. Cl.
*H02K 5/04* (2006.01)
*F16F 15/02* (2006.01)

(52) U.S. Cl.
CPC ............... *F16F 15/02* (2013.01); *H02K 5/04* (2013.01); *F16F 2228/04* (2013.01); *F16F 2228/066* (2013.01); *F16F 2230/0058* (2013.01)

(58) Field of Classification Search
CPC ........ H02K 5/04; F16F 15/02; F16F 2228/04; F16F 2228/066; F16F 2230/0058
(Continued)

(56) References Cited

U.S. PATENT DOCUMENTS

| 4,288,063 A | 9/1981 | Brenner et al. |
| 4,482,124 A | 11/1984 | Dochterman |

(Continued)

FOREIGN PATENT DOCUMENTS

| DE | 4329176 A1 | 3/1994 |
| EP | 0642296 A1 | 3/1995 |

(Continued)

OTHER PUBLICATIONS

International Search Report issued by the European Patent Office in International Application PCT/EP2014/051432 dated Feb. 20, 2014.

*Primary Examiner* — Forrest M Phillips
(74) *Attorney, Agent, or Firm* — Henry M. Feiereisen LLC (57) ABSTRACT

The invention relates to a device (10) for mechanically adjusting a vibration behavior of a machine element, wherein the device can be coupled to the machine element or is designed as a part of the machine element, the device comprises an adjustment section (11) for the adjustment and a cavity (12) arranged in the adjustment section, and a specified insertion apparatus (20) can be variably inserted into the cavity in such a way that the stiffness of the adjustment section can be changed. Thus the vibration behavior of the machine element can also be varied.

16 Claims, 6 Drawing Sheets

(58) Field of Classification Search
 USPC .......................................................... 310/89
 See application file for complete search history.

(56) References Cited

U.S. PATENT DOCUMENTS

| | | | |
|---|---|---|---|
| 5,499,791 | A | 3/1996 | Nakagawa et al. |
| 5,533,704 | A | 7/1996 | Fischinger et al. |
| 6,563,239 | B1 | 5/2003 | Baer et al. |
| 9,279,472 | B2 * | 3/2016 | Han .................... F16F 13/10 |
| 9,545,831 | B2 * | 1/2017 | Willems ................ B60G 7/006 |
| 9,685,835 | B2 * | 6/2017 | Colson .................... H02K 5/04 |
| 9,702,423 | B2 * | 7/2017 | Gustavsson ............ F16F 7/108 |

FOREIGN PATENT DOCUMENTS

| | | |
|---|---|---|
| EP | 1 286 076 | 2/2003 |
| RU | 2352837 C1 | 4/2009 |

\* cited by examiner

DEVICE FOR MECHANICALLY ADJUSTING VIBRATION BEHAVIOR OF A MACHINE ELEMENT

CROSS-REFERENCES TO RELATED APPLICATIONS

This application is the U.S. National Stage of International Application No. PCT/EP2014/051432, filed Jan. 24, 2014, which designated the United States and has been published as International Publication No. WO 2014/122037 and which claims the priority of European Patent Application, Serial No. 13154769.7, filed Feb. 11, 2013, pursuant to 35 U.S.C. 119(a)-(d).

BACKGROUND OF THE INVENTION

The invention relates to a device for mechanically adjusting vibration behavior of a machine element.

On machines and systems, rotational and/or translational movements frequently result in specific operating frequencies, which possibly match the natural frequencies of these machines/systems or individual components of these machines/systems or are very similar thereto. This results in disadvantageous resonance excitations, which produce high bearing forces and material stresses (quicker fatigue) particularly also in the case of firmly bonded connections such as weld seams. System reliability is herewith also negatively affected. Such vibrations may be system-inherent or also produced by adjacently positioned machines or systems, e.g. in a ship carcass made of steel, which conveys vibrations effectively due to the material, and in which in most cases a number of diesel generator sets or centrifugal masses are provided, which can each produce vibrations.

SUMMARY OF THE INVENTION

It is the object of the invention to provide a device, by means of which the vibration behavior of a machine, system, structural component or any other machine element can be optimized in a simple manner.

The object is achieved in accordance with the invention by a device for mechanically adjusting vibration behavior of a machine element, wherein
  the device can be coupled to the machine element or is embodied as part of the machine element,
  the device comprises an adjustment section for adjustment purposes and
  a cavity arranged in the adjustment section, and wherein
  a predetermined insertion apparatus can be variably inserted into the cavity such that the stiffness of the adjustment section can be changed.

Advantageous embodiments with expedient developments of the invention are specified in the dependent claims.

With respect to its function, such a device can also be referred to as a vibration frequency control means. The machine element is preferably a frame, machine housing or any structural component of a system. A fine balancing of a rotating component may be unnecessary for instance on account of the use of the inventive device. In the case of unfavorable natural vibrations, a flexible change in the damping characteristics of the adjustment section is possible, and no complicated change to a constructive structure or any other adjustment to a base stiffness is thus necessary.

The device for the mechanical adjustment of vibration behavior of a machine element can, in particular to adjust a natural frequency with the purpose of damping vibrations, be provided in a specific frequency range. The device can preferably be coupled to an electric motor. A bearing for supporting an insertion apparatus corresponding to the cavity is further preferably embodied in the cavity.

The relevant machine with the machine element can be embodied to execute rotational and/or translational movements or be coupled to a further machine element for the execution of such movements. The vibrations to be damped can be caused by these movements, however they may also involve oscillations or vibrations which are caused by the surroundings, in other words any other machine part.

The cavity can be at least partially closed using the insertion apparatus. A different vibration behavior which can be used for optimization purposes is produced by the mass change alone.

An area of a machine element in which a force is exerted onto the machine element or an additional mass can be inserted is to be understood here as an adjustment section.

An element consisting of one or a number of components is to be understood as an insertion apparatus, it being possible to plug or insert and/or geometrically deform said element while in the process largely remaining rigid and if necessary being able to exert a force, in particular by it being enlarged or reduced in size in terms of outer dimensions in at least one spatial direction.

A bearing is preferably understood as a bearing surface on which the insertion apparatus can come to rest in particular in a two-dimensional manner and can in particular exert a (pressure) force onto the adjustment section. As a result the cavity can be bent open, in other words enlarged, which generally results in a change in natural vibrations.

The vibrations of the machine element may be natural vibrations and/or vibrations which are caused by another machine coupled to the machine element or a machine arranged in the surroundings.

The insertion apparatus can be variably positioned in the cavity and/or can be bent open by the insertion apparatus compared to the empty recess. A change in the vibration behavior of the device and thus of the machine element can be achieved by both measures.

According to an advantageous exemplary embodiment, the adjustment section is provided on an edge region of the device so that the adjustment section is arranged so as to be easily accessible from its surroundings. The insertion apparatus can herewith exert a force particularly effectively onto the adjustment section, particularly in the case of round external geometries, in which a surface stress can influence the entire peripheral surface on account of the arrangement in the edge region. At the same time the cavity remains easily accessible. The volume-mass ratio of the device can also be changed, by the outer dimensions of the device being changed at least to a minor degree, in particular enlarged by the force. This can take place for instance by expanding or bending open the cavity.

According to an advantageous exemplary embodiment, a further insertion apparatus can be supported in the cavity, wherein the cavity in each case forms at least one bearing surface for the insertion apparatuses. A larger variability when adjusting the natural frequency can herewith be provided. Only one of the insertion apparatuses or also both can optionally be inserted into the cavity.

The bearing surface is preferably embodied as a snug fit for a two-dimensional positioning of the corresponding insertion apparatuses, in other words a surface which is geometrically and dimensionally matched to the geometry and dimensions of the insertion apparatus, and in which support is also possible solely by way of static friction.

According to an advantageous exemplary embodiment, at least one bearing surface for supporting the insertion apparatus is formed in the cavity, said insertion apparatus being aligned at an angle of inclination of greater than 0° compared with an installation direction for installing the insertion apparatus in the cavity. The bearing or bearings preferably comprise at least one conical inner lateral area, which can be coupled to a corresponding conical outer lateral area of the insertion apparatus(es). The conical lateral areas allow the force to be adjusted easily and continuously, in particular by the insertion apparatus being brought into contact therewith and being able to slide therealong with increasing force.

According to an advantageous exemplary embodiment, the cavity is embodied such that the predetermined insertion apparatus can be coupled to the adjustment section in a form and/or force-fit manner. The insertion apparatus can herewith be fixed to the device by way of static friction for instance. The advantage of fixing using static friction consists in the large variability of the arrangement of the insertion apparatus with respect to the device, thereby enabling a good fine adjustment of the natural frequency. The support can be embodied as one or a number of bearing surfaces, on which the insertion apparatus or a number of insertion apparatuses can be arranged in any position. With a form-fit coupling, certain positions are generally predetermined for the insertion apparatus(es).

According to an advantageous exemplary embodiment, the insertion apparatus comprises a first insertion part and a second insertion part, which are coupled to one another by way of a clamping element. The insertion parts can press here on the adjustment section and if necessary exert a force onto the cavity.

According to an advantageous exemplary embodiment, the first and/or second insertion part are molded conically. In the assembled state, the insertion apparatus can exert a force onto the adjustment section, which is aligned at an angle of greater than 45 degrees with respect of the assembly direction, preferably greater than 60 degrees, particularly in the range of 65 to 85 degrees.

According to an advantageous exemplary embodiment, the clamping element is a screw, wherein a force onto the adjustment section can be adjusted by a tightening force of the screw. With a comparably low force of the clamping element, a large force can be exerted onto the adjustment section in a direction perpendicular to the assembly direction, and the adjustment section can be widened and the stress within the adjustment section and also in a large region of the overall device can be changed.

In particular, an electric motor with a housing or frame can thus be realized, wherein the housing or the frame is equipped with a device as described above.

The features and feature combinations cited above in the description and the features and feature combinations cited subsequently in the description of the figures or shown alone in the figures cannot only be used in the respectively specified combination, but instead also in other combinations or alone, without departing from the scope of the invention.

BRIEF DESCRIPTION OF THE DRAWING

Further advantages, features and details of the invention result from the claims, the subsequent description of preferred embodiments and with the aid of drawings, wherein the same or functionally similar elements are provided with identical reference characters, in which:

DETAILED DESCRIPTION OF PREFERRED EMBODIMENTS

Figure 1:
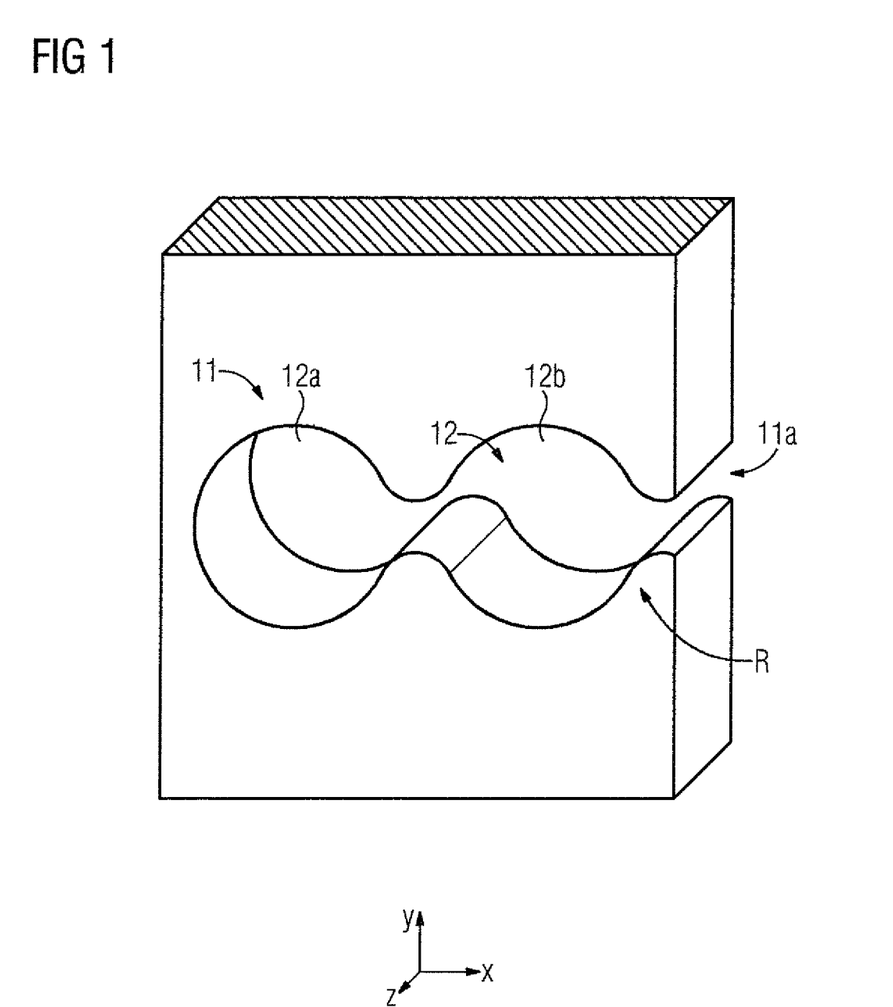
FIG. 1 shows a perspective side view of a cutout of a machine frame or housing with a cavity for an insertion apparatus.

FIG. 1 shows a cutout of a machine frame or housing with a cavity 12 for an insertion apparatus (not shown), wherein the cavity 12 is provided in an adjustment section 11 of the machine frame. The cavity 12 is formed by a first and second part 12a, 12b, which project into one another and together provide a lateral opening 11a in an edge region R of the adjustment section 11. The cavity does not however have to be provided with a lateral opening. The vibration and damping behavior of the machine frame can be influenced by the arrangement and geometry of the cavity 12.

Figure 2:
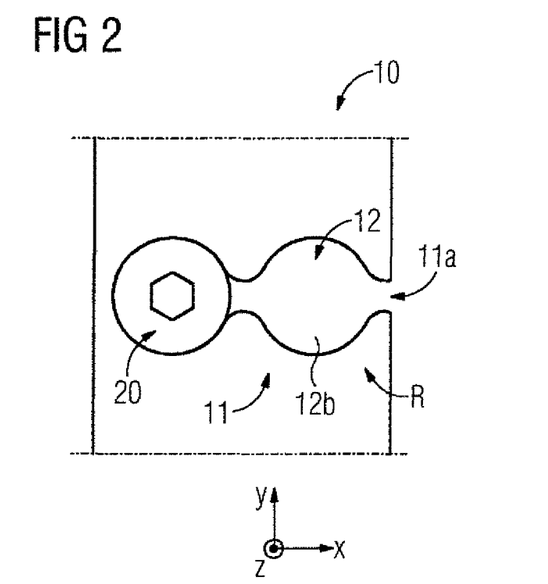
FIG. 2 shows a side view of the cutout in FIG. 1 with an insertion apparatus arranged in the cavity and coupled to the machine frame or housing, which insertion apparatus partially closes the cavity, as a result of which a device according to a first exemplary embodiment of the invention is provided.

An insertion apparatus 20 which partially closes the cavity 12 is shown in FIG. 2, as a result of which a device 10 is provided, by means of which a force can be exerted onto the adjustment section 11, in particular in the y-direction. The insertion apparatus 20 can optionally be arranged in the left or right part of the cavity here by a form-fit. The force can if applicable result in the cavity being bent open or widened. The stiffness of the adjustment section 11 changes accordingly. This results in a change in the natural frequencies. If the adjustment section 11 or the machine frame has a resonance frequency at a frequency f1 for instance, the resonance frequency moves to the frequency f2, which differs from f1, through the insertion apparatus.

Figure 3:
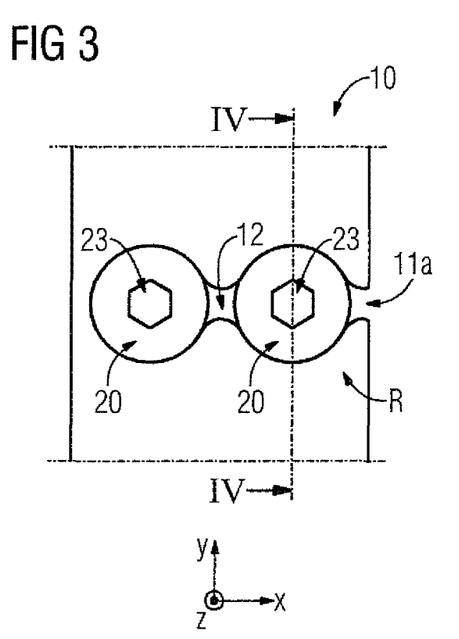
FIG. 3 shows a side view of a cutout from a machine frame or housing with two cavities projecting into one another and with two insertion apparatuses arranged in the cavities and coupled to the machine frame or housing, said insertion apparatuses partially closing the cavities, as a result of which a variant of the device according to a first exemplary embodiment of the invention is provided.

FIG. 3 also shows a second insertion apparatus 20 arranged to the right 12b in the cavity, wherein the entire cavity is partially closed by the two insertion apparatuses 20. The insertion apparatuses 20 can each be clamped by way of a clamping element 23 in the adjustment section, in particular in the z-direction, and individually exert a force onto the adjustment section 11, in particular in the y-direction. Here the arrangement of the insertion apparatuses 20 is predetermined by the geometry of the cavity 12. A new resonance frequency f3, which differs from f1 to f2, is produced for instance on account of the two insertion apparatuses 20 in the cavity 12.

Figure 4:
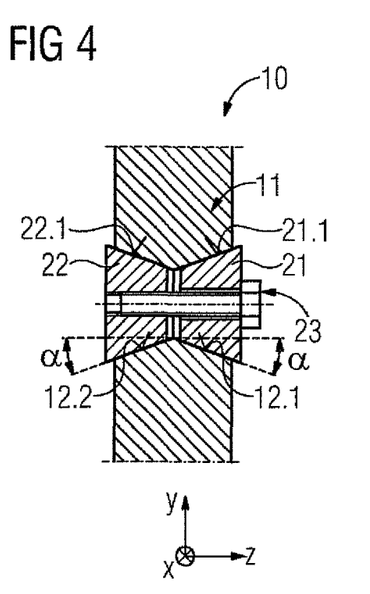
FIG. 4 shows a sectional view of the device shown in FIG. 3, wherein a structure of the insertion apparatus is shown in detail.

FIG. 4 shows one of the insertion apparatuses 20 with the clamping element 23 in accordance with the section III shown in FIG. 3, wherein the insertion apparatus 20 is formed from two rotationally symmetrical insertion parts 21, 22, which each comprise a conical outer lateral area 21.1, 22.1. The insertion parts 21, 22 are arranged relative to one another such that the conical outer lateral surfaces 21.1, 22.1 face one another and form an X-arrangement. Corresponding inner lateral areas are provided on the adjustment section 11 in the cavity, namely a first conical inner lateral area 21.1 and a second conical inner lateral area 12.2. The inclination of the conical inner lateral areas 12.1, 12.2 and/or the conical outer lateral areas 21.1, 22.1 can be defined by way of an angle of inclination >0° relative to the z-direction (installation direction).

The clamping element 23 is embodied here as a screw, which is guided in each case in an inner thread of the insertion parts 21, 22 and pulls the insertion parts 21, 22 toward one another and as a result exerts a force onto the inner lateral areas 12.1, 12.2, which is essentially aligned in a y-direction, depending on the inclination of the conical surfaces. The insertion parts can however also be connected to one another by means of another connecting technique, e.g. by means of pins which ensure a reliable force or form-fit.

In the position shown, the force onto the adjustment section or its expansion can be further increased, by the insertion parts 21, 22 being moved by further clamping of the screws 23 onto one another, particularly until they come into contact with one another, wherein the respective lateral areas slide along one another. The tightening of the screws also brings about a displacement of the natural frequencies or the/a resonance frequency.

Figure 5:
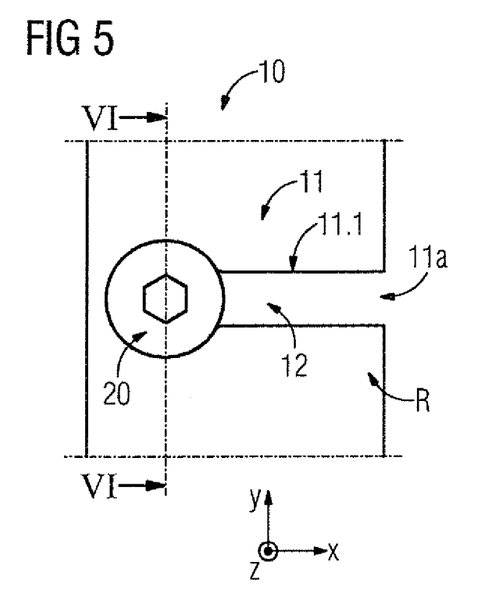
FIG. 5 shows a side view of a cutout from a machine frame or housing with a cavity and an insertion apparatus arranged in the cavity and coupled to the machine frame or housing, which insertion apparatus partially closes the cavity, as a result of which a device according to a second exemplary embodiment of the invention is provided.
Figure 6:
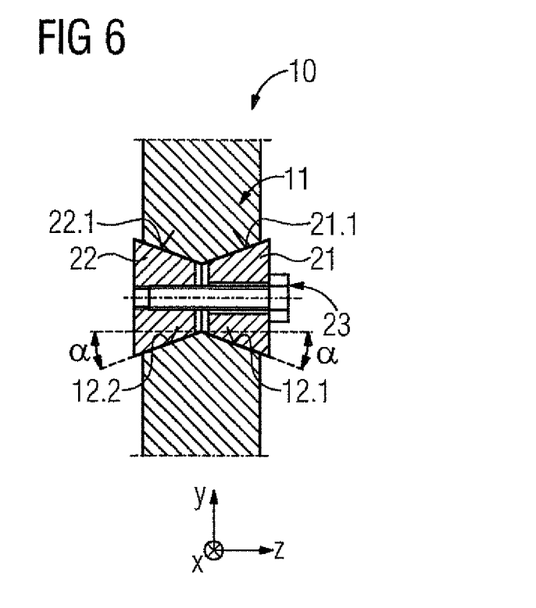
FIG. 6 shows a sectional view of the device shown in FIG. 5, wherein a structure of the insertion apparatus is shown in detail.

An exemplary embodiment is shown in FIG. 5, in which a recess 12 is provided for an individual insertion apparatus 20. The adjustment section 11 comprises a linear opening area 11.1 which is predetermined by the cavity 12, said opening area in the variant of the insertion apparatus 20 shown being free, without an insertion apparatus being arranged therein. FIG. 6 shows the insertion apparatus 20 in accordance with the section V shown in FIG. 5, wherein the insertion apparatus 20 has a structure corresponding in FIG. 5.

Figure 7:
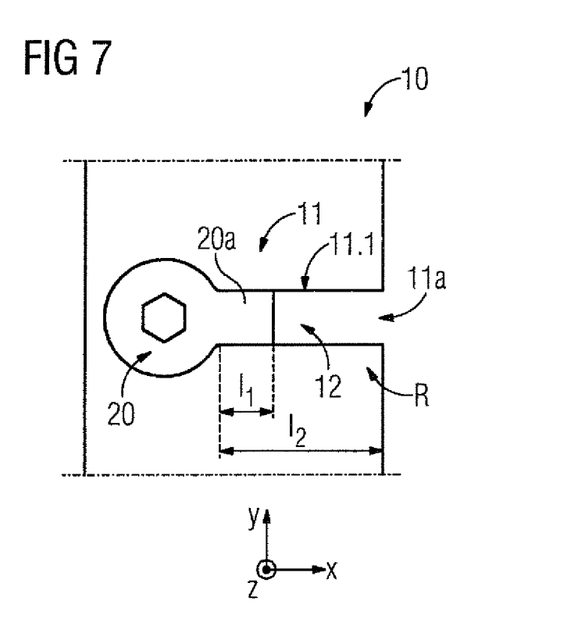
FIG. 7 shows a side view of a cutout from a machine frame or housing with a cavity and an insertion apparatus arranged in the cavity and coupled to the machine frame or housing, as a result of which a variant of the device is provided in accordance with a second exemplary embodiment of the invention.

FIG. 7 shows a variant of the insertion apparatus 20, in which the insertion apparatus 20 is also arranged in the linear opening area 11.1. The insertion apparatus 20 has an appendage 20a, which extends into the linear opening area 11.1, particular approximately halfway. The effect of the insertion apparatus 20 on the adjustment region 11 can be adjusted across the length 11 of the appendage 20a in respect of the length 12 of the linear opening region 11.1. The longer the appendage 20a, the larger the region in which a force can be introduced into the adjustment section 11. Here the arrangement of the insertion apparatus 20 is predetermined by the geometry of the cavity 12. The appendage 20a also represents an increase in mass compared with the example in FIG. 5, as a result of which the natural frequencies of the machine element are displaced. Moreover, the appendage provides an anti-twist protection, which, if necessary, can also be realized by rills or grooves in the lateral surfaces of the insertion apparatus 20 and/or the cavity 12.

Figure 8:
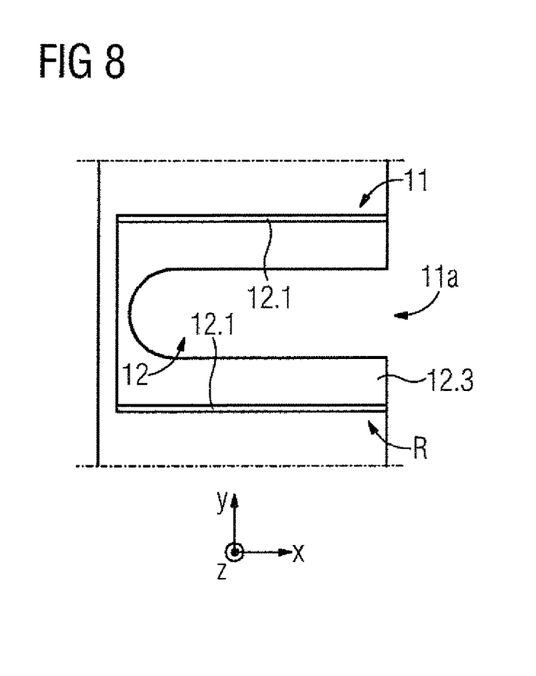
FIG. 8 shows a side view of a cutout from a machine frame or housing with a cavity for an insertion apparatus.

A cavity 12 which is embodied to receive a differently clamped insertion apparatus 20 (not shown) is shown in FIG. 8. To this end, the cavity 12 comprises surfaces 12.1, which run in an xy-plane (perpendicular to the assembly direction y) and are aligned in parallel to one another. Furthermore, the cavity 12 comprises a part 12.3 which protrudes inwards into the cavity 12, to which part 12.3 an insertion apparatus (not shown) can be fixed. In the protruding part 12.3, fastening or guide means (not shown) can be provided, e.g. through-holes.

Figure 9:
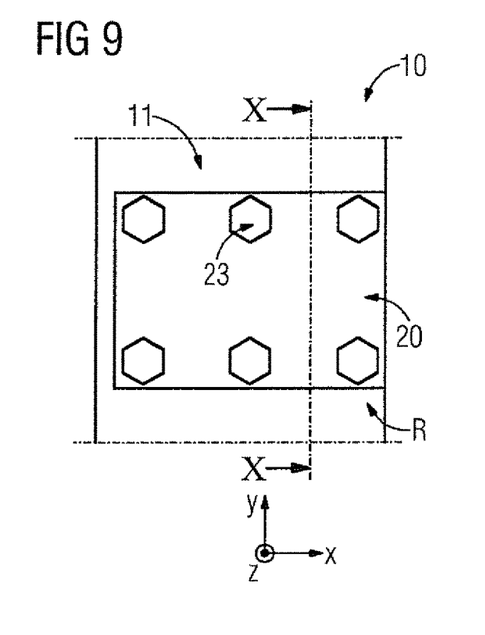
FIG. 9 shows a side view of the cutout in FIG. 8 with an insertion apparatus arranged in the cavity and coupled to the machine frame or housing, said insertion apparatus completely closing the cavity, as a result of which a device according to a third exemplary embodiment of the invention is provided.

An insertion apparatus 20 completely closing the cavity 12 in FIG. 8 is shown in FIG. 9, said insertion apparatus 20 being coupled to the adjustment section 11 by means of a plurality of clamping elements 23. The coupling can take place by static friction or by at least partially fastening the clamping elements to the adjustment section 11.

Figure 10:
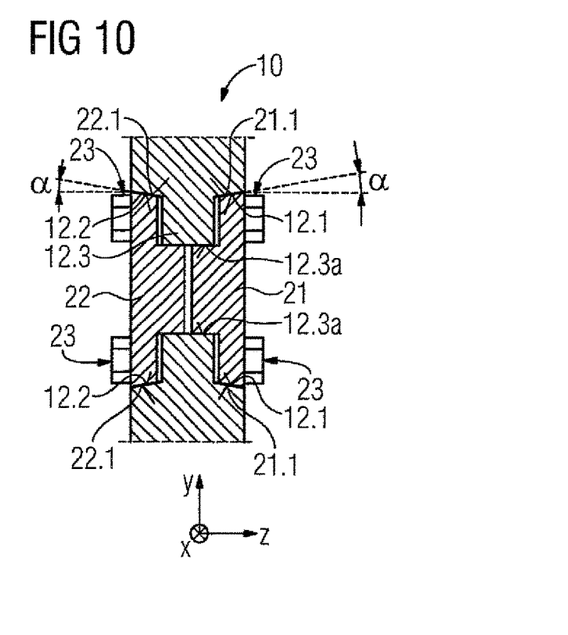
FIG. 10 shows a sectional view of the apparatus shown in FIG. 9, wherein a structure of the insertion apparatus is shown in detail.

The structure of the insertion apparatus 20 is shown in FIG. 10 according to the section IX indicated in FIG. 9. The insertion apparatus 20 is formed from two insertion parts 21, 22 in the form of plate-type wedges, which each have two surfaces 21.1, 22.1 running obliquely at an angle α with respect to the z-direction (assembly direction). The insertion parts 21, 22 can be mounted on front faces 12.3a of the protruding part 12.3, as a result of which a relative movement of the adjustment section 11 can be limited in the y-direction. The movement of the front faces 12.3a is then limited by the insertion parts 21, 22. The insertion parts 21, 22 are thus arranged relative to one another so that the surfaces 21.1, 22.1 face one another and form an X-arrangement. Corresponding surfaces are provided on the adjustment section 11, namely two first surfaces 12.1 arranged facing away from one another and two second surfaces 12.2 arranged facing away one another. These surfaces also run obliquely with respect to the z-direction. If the insertion parts 21, 22 are mounted in the adjustment section 11, the front faces 12.3a are moved away from the insertion parts 21, 22 in or counter to the y-direction. A displacement of the natural frequencies of the adjustment section results again therefrom.

The clamping elements 23 are embodied e.g. as screw bolts, which are each guided in one of the insertion openings 21, 22 and in the assembled state of the insertion parts 21, 22 pull on the projecting part 12.3 of the cavity 12 and as a result exert a force onto the surfaces 12.1, 12.2 or the adjustment section 11, which is essentially aligned in a y-direction, depending on the inclination of the surfaces. The inclination of the surfaces 12.1, 12.2 and/or the surfaces 21.1, 22.1 can be defined by way of an angle of inclination α relative to the z-direction. In the position shown, the force can be further increased, by the insertion parts 21, 22 being moved closer to the projecting part 12.3 by further clamping the screws 23, particular until they come into contact therewith, wherein the respective surfaces slide along one another.

The screws 23 either connect both insertion parts 21, 22 to one another or engage in an inner thread (not shown) on the projecting part 12.3. The inner thread can be embodied here such that a shift in the screw 23 in the y-direction is possible, e.g. as a longitudinal hole with a thread-type structure on opposing surfaces. A screw and nut can also be provided in pairs, wherein the screw is guided in a longitudinal hole in the projecting part 12.3.

Neither the adjustment section nor the insertion apparatus have to always have an inclined surface (e.g. conical surface) with respect to the assembly direction (z-direction). Instead, clear fits or other force-fits can also be used for the connection of both components.

Figure 11:
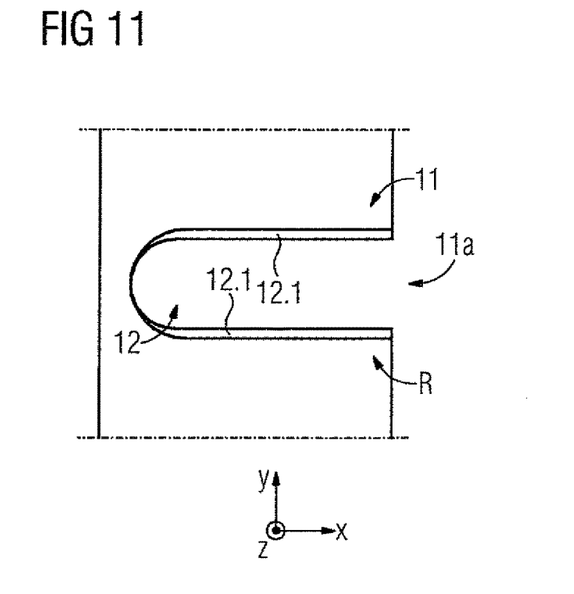
FIG. 11 shows a side view of a cutout from a machine frame or housing with a cavity for an insertion apparatus.

A cavity 12 is shown in FIG. 11, which comprises two opposite obliquely running surfaces 12.1. The cavity 12 is embodied longitudinally in the x-direction for the arrangement of an insertion apparatus (not shown) which can be supported in the cavity 12 at different x-positions. The cavity 12 herewith comprises surfaces 12.1, which run in the x-direction and are aligned inclined relative to one another about the x-axis.

Figure 12:
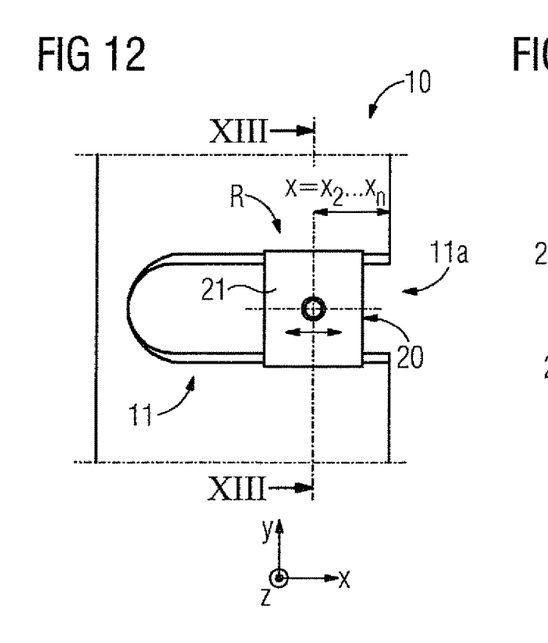
FIG. 12 shows a side view of the cutout in FIG. 11 with an insertion apparatus arranged in the cavity and coupled to the machine frame or housing, which insertion apparatus partially closes the cavity and is displaceably coupled to the cavity, as a result of which a device according to a fourth exemplary embodiment of the invention is provided.

FIG. 12 shows an insertion apparatus 20 coupled to the adjustment section 11 in FIG. 11, said insertion apparatus partially closing the cavity 12 and being displaceable in the x-direction. The insertion apparatus 20 can be arranged in a plurality of different x-positions. The stiffness or the vibration behavior of the adjustment section 11 can be adjusted here particularly flexibly. In this way the x-position of the insertion apparatus 20 can be changed within the limits of the cavity 12.

Figure 13:
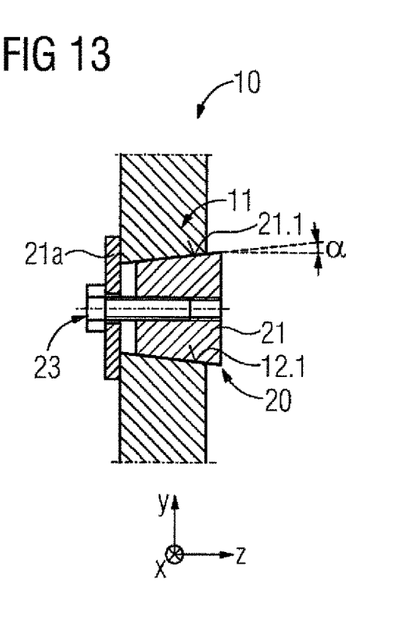
FIG. 13 shows a sectional view of the device shown in FIG. 12, wherein a structure of the insertion apparatus is shown in detail.

FIG. 13 shows the structure of the insertion apparatus 20 in accordance with the section XII indicated in FIG. 12, wherein an insertion part 21 is also shown in cross section for the purpose of better understanding. A conical outer lateral area 21.1 is provided on the insertion part 21, said outer lateral area having an angle of inclination α relative to the z-direction. The insertion part 21 can be pulled into the cavity 12 by way of a screw 23 in the z-direction (assembly direction) in order to exert a force in the y-direction onto the adjustment section 11. The screw 23 is passed through a counter plate 21a, which comes into contact with the adjustment section 11. The counter plate 21a can be embodied from a material with a specific surface roughness, by means of which a good static friction of the counter plate 21a to the adjustment section 11 can be ensured.

Figure 14:
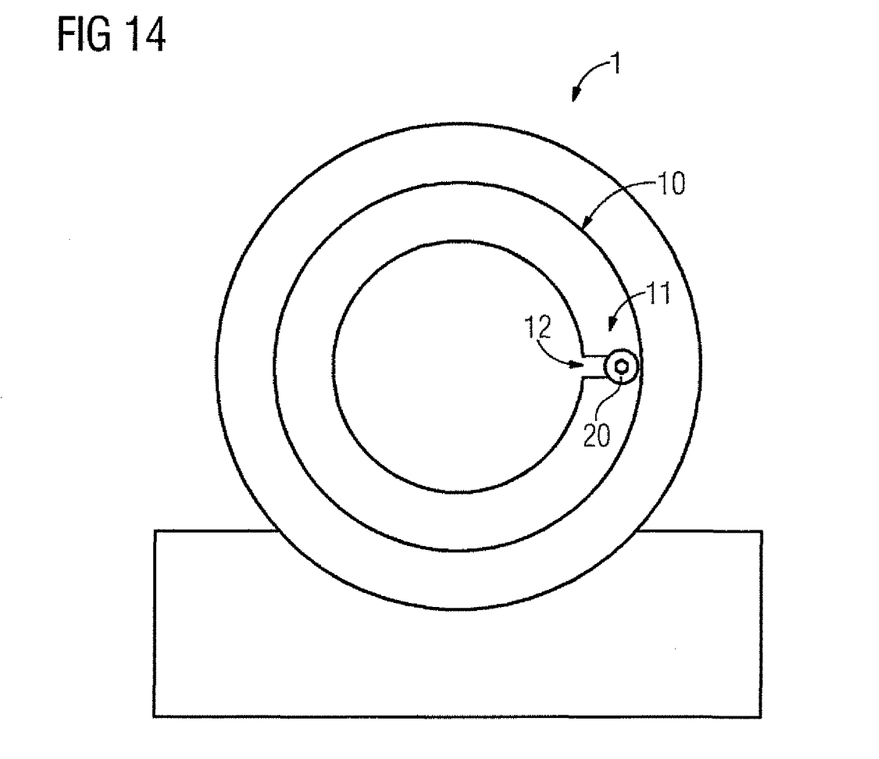
FIG. 14 shows a side view of an electric motor, on which an apparatus according to one of the exemplary embodiments of the invention is provided.

An electric motor is shown in FIG. 14 to be representative of any machine or system, on which electric motor a device 10 illustrated as above in several variants is provided in order to adjust a natural frequency of the electric motor 1 or its housing or frame, wherein the device 10 comprises an adjustment section 11, in which a cavity 12 is provided. An insertion apparatus 20 is arranged in the cavity 12, said insertion apparatus being coupled to the adjustment section 11 and exerting a force onto the adjustment section 11.

On account of the additional mass and position of the insertion apparatus and its force exerted onto the adjustment section, this applies to all embodiments, the natural frequencies of the housing, frame or electric motor change compared with the instance of an empty cavity. These parameters also displace resonance frequencies, so that these are not excited by the relevant machine (e.g. electric motor). After a suitable displacement of the resonance frequency, an excitation can then take place for instance with a frequency significantly different to the resonance frequency, as a result of which a reduction or damping of the natural vibrations is actually achieved.

The invention claimed is:

1. A device for mechanically adjusting vibration behavior of a machine element, said device comprising:
   an adjustment section;
   a first insertion apparatus variably insertable in a first cavity of the adjustment section to thereby enable a modification in the stiffness of the adjustment section, said first insertion apparatus being sized to bend open the first cavity, when the first insertion apparatus is inserted in the first cavity, said first insertion apparatus including a first insertion part longitudinally aligned with a second insertion part, and a clamping element adapted to couple the first and second insertion parts to one another; and
   a second insertion apparatus laterally spaced from the first insertion apparatus and insertable in a second cavity of the adjustment section, said first and second cavities laterally spaced apart and joined to each other to form a continuous opening, said first and second cavities being shaped to provide at least one bearing surface for each of the insertion apparatuses.

2. The device of claim 1, coupled to the machine element or forming part of the machine element.

3. The device of claim 1, wherein the insertion apparatus is configured for variable positioning in the cavity.

4. The device of claim 1, wherein the adjustment section is provided on an edge region of the device to enable access to the adjustment section from its surroundings.

5. The device of claim 1, wherein the cavity is shaped to provide at least one bearing surface for support of the insertion apparatus, said at least one bearing surface being aligned at an angle of inclination of greater than 0° in relation to an assembly direction for assembly of the insertion apparatus in the cavity.

6. The device of claim 1, wherein the cavity is configured to enable a coupling of the predetermined insertion apparatus to the adjustment section by a form fit or force fit.

7. The device of claim 1, wherein at least one of the first and second insertion parts is shaped conically.

8. The device of claim 1, wherein the clamping element is a screw adapted to adjust a force onto the adjustment section by varying a tightening force of the screw.

9. An electric motor, comprising:
   a housing or frame; and
   a device connected to the housing or frame for mechanically adjusting vibration behavior of the housing or frame, said device comprising an adjustment section, and a first insertion apparatus variably insertable in a first cavity of the adjustment section to thereby enable a modification in the stiffness of the adjustment section, said first insertion apparatus being sized to bend open the first cavity, when the first insertion apparatus is inserted in the first cavity, said first insertion apparatus including a first insertion part longitudinally aligned with a second insertion part, and a clamping element adapted to couple the first and second insertion parts to one another, a second insertion apparatus laterally spaced from the first insertion apparatus and insertable in a second cavity of the adjustment section, said first and second cavities laterally spaced apart and joined to each other to form a continuous opening, said first and second cavities being shaped to provide at least one bearing surface for each of the insertion apparatuses.

10. The electric motor of claim 9, wherein the device is coupled to the housing or frame or forming part of the housing or frame.

11. The electric motor of claim 9, wherein the insertion apparatus is configured for variable positioning in the cavity.

12. The electric motor of claim 9, wherein the adjustment section is provided on an edge region of the device to enable access to the adjustment section from its surroundings.

13. The electric motor of claim 9, wherein the cavity is shaped to provide at least one bearing surface for support of the insertion apparatus, said at least one bearing surface being aligned at an angle of inclination of greater than 0° in relation to an assembly direction for assembly of the insertion apparatus in the cavity.

14. The electric motor of claim 9, wherein the cavity is configured to enable a coupling of the predetermined insertion apparatus to the adjustment section by a form fit or force fit.

15. The electric motor of claim 9, wherein at least one of the first and second insertion parts is shaped conically.

16. The electric motor of claim 9, wherein the damping element is a screw adapted to adjust a force onto the adjustment section by varying a tightening force of the screw.

* * * * *

UNITED STATES PATENT AND TRADEMARK OFFICE
CERTIFICATE OF CORRECTION

PATENT NO. : 9,995,364 B2  
APPLICATION NO. : 14/766907  
DATED : June 12, 2018  
INVENTOR(S) : Guderian et al.

Page 1 of 1

It is certified that error appears in the above-identified patent and that said Letters Patent is hereby corrected as shown below:

On the Title Page

Item [56] FOREIGN PATENT DOCUMENTS: correct the mentioned European patent document to read --EP 0642206 A1--.

Signed and Sealed this  
Second Day of October, 2018

Andrei Iancu  
*Director of the United States Patent and Trademark Office*